United States Patent [19]

Maccianti et al.

[11] Patent Number: 4,849,979

[45] Date of Patent: Jul. 18, 1989

[54] FAULT TOLERANT COMPUTER ARCHITECTURE

[75] Inventors: Tiziano Maccianti, Pregnana Milanese; Luciano Raimondi, Milan, both of Italy

[73] Assignee: Bull HN Information Systems Italia S.p.A., Caluso, Italy

[21] Appl. No.: 93,429

[22] Filed: Sep. 4, 1987

[30] Foreign Application Priority Data

Sep. 17, 1986 [IT] Italy .......................................... 21727

[51] Int. Cl.$^4$ .............................................. G06F 11/16
[52] U.S. Cl. .............................................. 371/68; 371/9
[58] Field of Search ....................... 371/68, 3, 16, 8, 9; 364/186, 187, 200 MS File

[56] References Cited

U.S. PATENT DOCUMENTS

| | | | |
|---|---|---|---|
| 4,096,989 | 6/1978 | Tawfik | 371/68 |
| 4,099,234 | 7/1978 | Woods et al. | 364/200 |
| 4,222,515 | 9/1980 | Strelow | 371/68 |
| 4,233,682 | 11/1980 | Liebergot | 371/68 |
| 4,400,792 | 8/1983 | Strelow | 371/68 X |
| 4,541,094 | 9/1985 | Stiffler | 371/68 |

Primary Examiner—Jerry Smith
Assistant Examiner—Robert W. Beausoliel
Attorney, Agent, or Firm—Faith F. Driscoll; John S. Solakian

[57] ABSTRACT

A fault tolerant computer architecture in which a functional unit is duplicated and the input and output signals to and from the two units are compared with each other by comparators to provide an error signal in case of different behavior of the two units, resulting in different input/output signals. The operation of both functional units is controlled by a first read only control memory or alternatively by a second read/write control memory once it has been loaded with microprograms, under control of the first read only control memory. The correct behavior of the comparators is tested in a diagnostic mode by having one functional unit operated under control of the first memory and the other functional unit operated under control of the second memory, so that the two units are controlled to perform different functions which force the comparators to produce an error indication, the absence of which indicates that the comparators operation is faulty.

4 Claims, 4 Drawing Sheets

FAULT TOLERANT COMPUTER ARCHITECTURE

BACKGROUND OF THE INVENTION

1. Field of Use

The present invention relates to a fault tolerant computer architecture.

2. Prior Art

It is known that due to the advent of integrated circuit technologies and the consequent cost and size reduction of the electronic components, fault tolerant computers have been proposed and put in the market. The concept of fault tolerance, as used with reference to computers, is very broad and includes all the expedients which make possible the correct operation of a computer even in presence of a failure, or at least the immediate detection of a failure, in order to avoid incorrect data handling and the propagation and spreading of errors in the set of handled data. In other words, it is essential that failures do not result in data errors.

Several computer architectures are used to achieve this result: the spread is from majority logic architectures to simple logic redundancy architectures. In the majority logic architectures, the various processing functions are performed jointly in parallel by three or more functional units, with a comparison of the input and output data so that, in case of discrepancy among the input data or the output data, valid data are recognized as those which coincide with the input or output of two functional units, and that data which differ from the majority is discarded as incorrect data.

It is clear that this kind of system may operate without causing data errors even if a failure is present in one functional unit until the occurrence of a further failure, affecting a functional unit in a data flow parallel to the one of the already faulty units. During this time interval, it is possible to assure a continued service of the equipment even if the faulty unit is temporarily removed from the system for purpose of replacement or repairment.

In simple logic redundancy architectures, this objective is relinquished and it is only assured, through suitable redundancies, that a failure is immediately detected, so as to stop the running of logical processes without affecting the data correctness and integrity. Thereafter, by suitable diagnostic procedures, the defective unit may be identified, excluded from the system, replaced with a spare unit if available, or repaired.

In the most elementary form of redundancy architecture, the computer may be provided with parity bit generators and checkers in those nodes or units where information loss is more likely to occur, for instance, in the working memories. In the most sophisticated redundancy architectures, all the functional units or most are duplicated and simultaneously operated in parallel.

Comparators, suitably located, compare the data pair as an input to, or output from each pair of functional units and upon the occurrence of a discrepancy provide a fault signal and cause a system halt. The problem in such architectures is checking the comparators functionality. The most common approach is also to duplicate the comparators, giving rise to further complications and other disadvantages, such as increases in driven loads and failure probability.

Another approach is to cause, under test conditions, an alteration at one of the data in inputs to the several comparators to check if they effectively provide an error indication. This may be obtained by providing, upstream of one input set of each comparator, a set of exclusive OR (EX OR) gates. Such gates, depending on the logic level present at one "control" input, transfer an output, the logic level present at the other input in direct or inverted form. Therefore, they allow altering at will, the data at the input to the comparators to check the effective generation of an error signal. Even in this case, however, a further complication results in terms of an increase in the failure probability and cost.

It would be possible, in order to simplify the structure, to use a single set of exclusive OR gates, located in the information flow so as to simulate a data error with effects which propagate in cascade in a line of functional units and not in the other one, therefore with consequences affecting the operation of the functional units located downstream and detectable by the comparators located downstream. This approach reduces but does not overcome the above-mentioned disadvantages. In addition, it has the disadvantage of introducing propagation delays in the logic flow, delays which are generally unacceptable.

SUMMARY OF THE INVENTION

The above disadvantages and limitations are overcome by the fault tolerant computer architecture of the present invention wherein the test of the several comparators and the correct performance of the functional units is obtained by stimulating the functional units in parallel with each other with different instructions, so that, under test conditions, the functional units, normally, operating in the same way, are compelled to work in a different way and produce different information sets as inputs and outputs which sets must necessarily cause the comparators to produce an error indication. This operative mode is obtained by using a read only control memory (ROM), already provided and used for the loading of a read-write control store (RAM) by a bootstrapping process, jointly with the use of the read-write control store, so that a first set of functional units operates under control of the ROM and a second set of functional units operates under control of the RAM. In this way, the test operation may be performed without need of EX OR gates inserted in the data flow path upstream of the comparators and the above-mentioned disadvantages are avoided. Further, as it will appear more clearly in the following, only few additional logic components are required.

A further aspect to consider, which has been mentioned, relates to the need to avoid error propagation from one functional unit to another, for instance from a processor to a memory in a multiprocessor system where several processors share a common working memory. In this case, it is advisable that the failure detected in one processor causes the immediate halt and placing out of service of the faulty processor, but not halt the other processors and the common working memory. However, it must be assured that if the fault occurs during a read/write operation of the working memory, the memory is not affected by an incorrect operation. Even this requirement is met by the fault tolerant system architecture of the present invention.

Finally, it is known that the operation speed of several integrated circuits is adversely affected by the load connected to their outputs. Such load causes a degradation of the signal edges and therefore a delay and a spread of the logical switching. The fault tolerant architecture of the invention exploits the functional redundancies to achieve a load distribution over several equivalent functional units so as to overcome this limitation. These and other features and the resulting advantages will appear more clearly from the following description of the preferred embodiment.

DESCRIPTION OF THE PREFERRED EMBODIMENT

Figure 1:
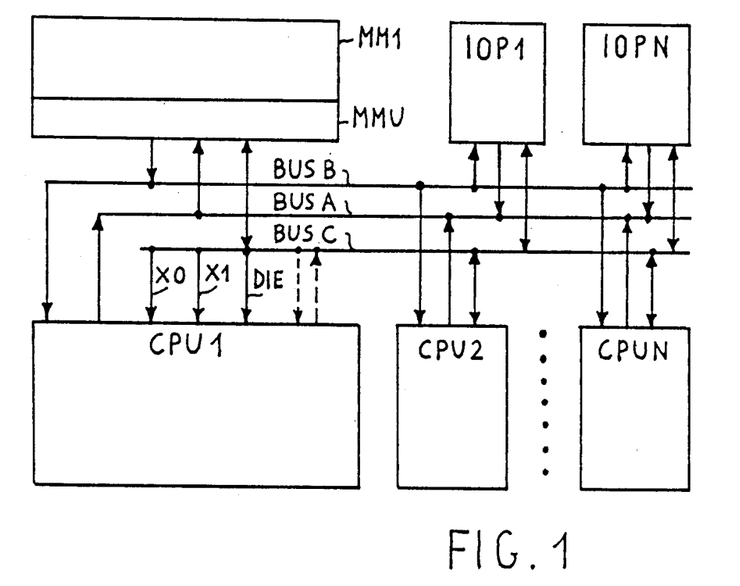
FIG. 1 in block diagram form, a multiprocessor system which includes the fault tolerant architecture of the present invention.

FIG. 1 shows in block diagram form, a multiprocessor system containing the fault tolerant architecture of the present invention. The system comprises a plurality of central processing units CPU1, CPU2, CPUN, a plurality of control processors IOP1, . . . IOPN for input/output devices such as disk units, tape units, communication units, printers, and a common working memory MM1, having its own control unit MMU. The central processing units CPU1 . . . CPUN, the I/O processors IOP1 . . . IOPN and the working memory MM1 (through its control unit MMU) are connected each other through a system bus comprising essentially three sections.

The first section is a unidirectional bus BUSA for transferring data, addresses, commands, having 32 leads plus four leads for the transfer of parity control bits, from any one of the CPU processors or I/O processors to memory MM1. The second section is a unidirectional bus BUS B for transferring data read out from memory MM1 to any one of the CPU processors or I/O processors. BUS B comprises 32 leads plus four leads for the transfer of parity control bits. The third section is a bus BUS C comprising a suitable number of leads, for transferring timing and control signals, in particular, two timing signals X0 and X1, generated by MMU, having a fixed frequency and used by the several processors to work in synchronism with the memory, and a DIE signal issued by MMU for signalling to the processors that BUS B is to be loaded with information read out from memory. Other signals, used for conflict resolution in the access of the bus and for indicating the destination of the information read out from memory, are not shown since they are beyond the scope of the invention and unessential for its understanding.

Figure 2:
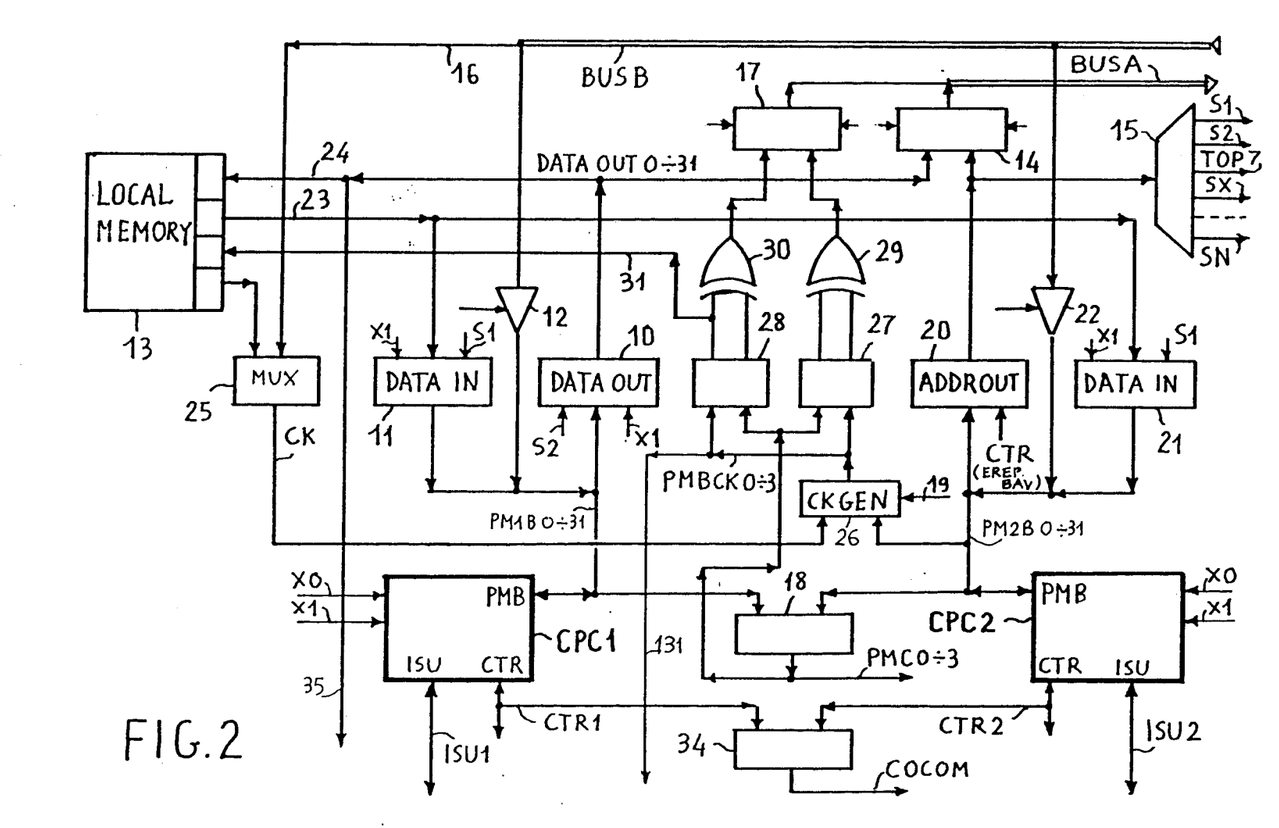
FIGS. 2 and 3 jointly show in detailed circuit diagram form, the architecture of a processor in the system of FIG. 1.
Figure 3:
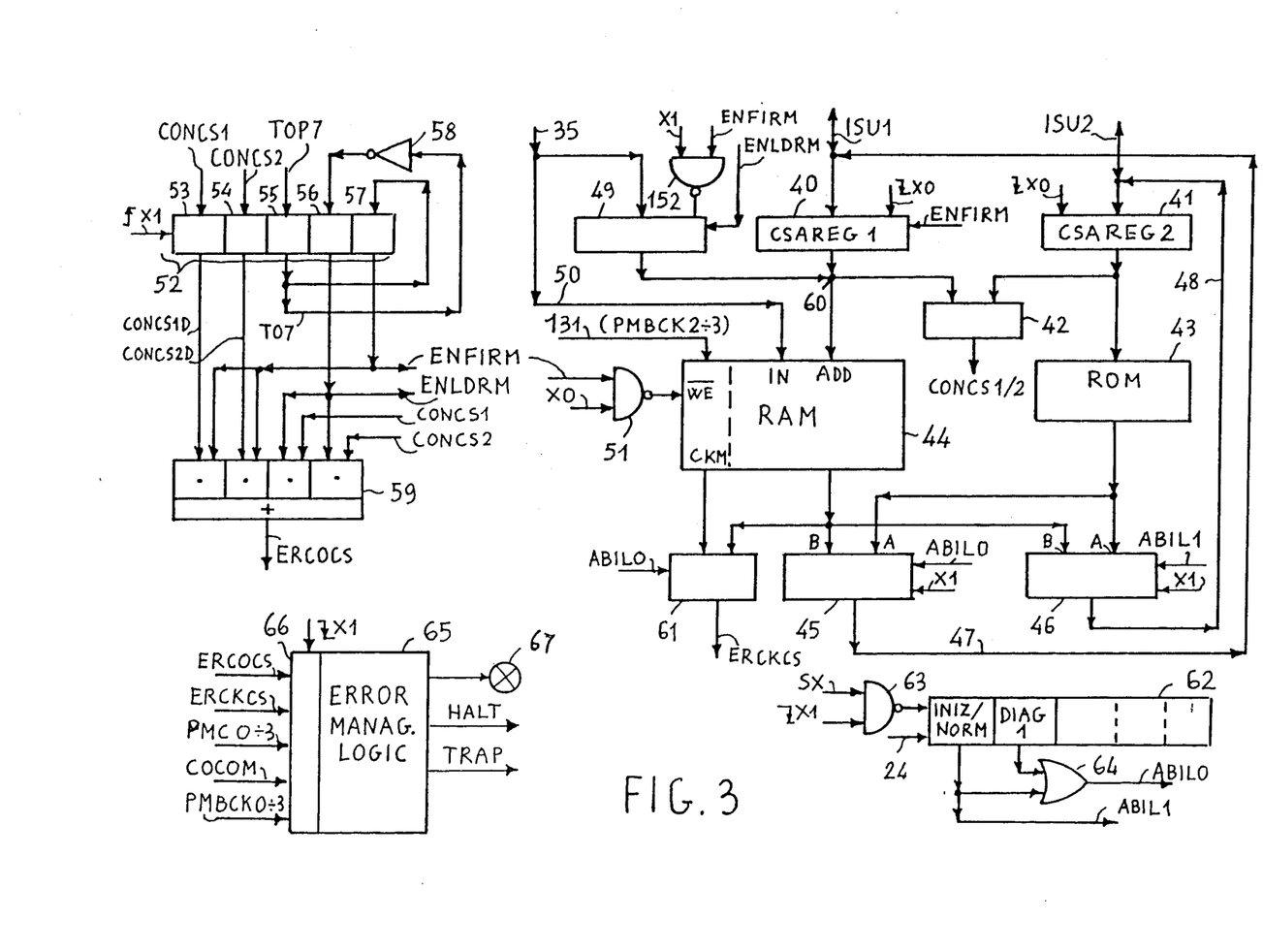

FIGS. 2 and 3 jointly show a central processing unit, such as CPU1, constructed according to the fault tolerant architecture of the invention. The core of the central processing unit consists of an integrated microprocessor CPC1, preferably the microprocessor designated as NCR/32 manufactured and distributed by NCR Corporation. The microprocessor has a 32-bit parallelism and performs all the functions normally required of a computer. A detailed description of the internal structure of the microprocessor, its operation and the set of performed instructions is contained in the manual titled, "NCR/32 General Information" published by NCR Corporation, Dayton, Ohio, U.S.A. and dated 1984.

For the purposes of the invention, it suffices to say that the microprocessor is provided with a bidirectional input/output port PMB having 32 terminals, with two timing inputs for receiving two non-overlapped timing signals X0 and X1 having the same frequency, with a bidirectional input/output port ISU having 16 terminals and a multiple terminals port CTR for receiving or outputting control signals.

The NCR/32 microprocessor is microprogrammed and executes microprograms residing in a control store. Its operation may be easily understood with reference to the timing diagram of FIG. 4 which shows the levels of timing signals X0 and X1 and the corresponding states of ports ISU and PMB. The rising edge of signal X0 defines the beginning or end of a machine or microprocessor cycle (i.e., cycles 1, 2, 3 and 4). During the time interval in which X0 is high or at logic level 1, port ISU is enabled to output from the microprocessor, a control store address CSADDR. This address is used by a control store to reference a microinstruction which can be placed on port ISU when X0 is at logic level 0. During the same machine cycle, (cycle 1) when signal X1 is at logic level 1, port ISU is enabled at its input, and the microinstruction present at port ISU may be transferred inside the microprocessor and latched with the falling edge of timing signal X1. This microinstruction, already present at the beginning of the next subsequent cycle (cycle 2), controls the operation of the microprocessor in the course of such cycle.

Figure 4:
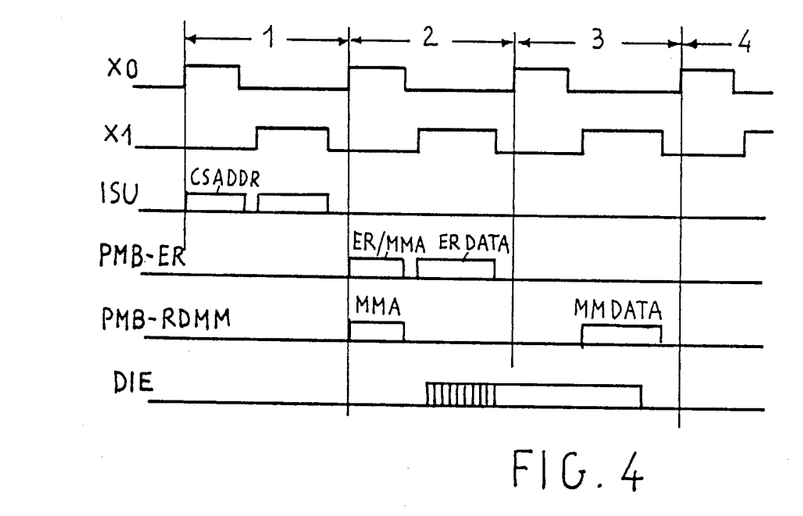
FIG. 4 is a timing diagram showing the basic operation cycle of a microprocessor used in the architecture of FIGS. 2 and 3.

If the controlled operations require an information transfer, an input to or output from microprocessor, the state of port PMB is controlled as follows. In case of a transfer from or to an external register connected to PMB, during the time interval in which X0=1, port PMB is controlled at its output and provides a selection and control code, generally a register address (ER,-MMA). Subsequently, during the time interval in which X1=1, it is controlled at its input or output to receive from or transfer to the selected register, a 32-bit data code (ER DATA). This occurs during the same machine cycle (cycle 2 diagram PMB-ER).

In the case where the controlled operation is a memory write, the state of port PMB does not differ from one of the preceding cases. On the contrary, if the requested operation is a memory read (i.e., diagram PMB-RDMM), this is performed in more machine cycles. In the course of a first cycle (cycle 2) when X0=1, a memory address MMA is outputted on port PMB and the microprocessor is set to a wait state, waiting for an available data signal (DIE) which is received, through one of the BUSC leads to one of the CTR port inputs. If such signal is available in the course of an interval X1=1, during the subsequent interval in which X1=1, the read out data is available at PMB and is loaded into the microprocessor (MM DATA). Therefore, two machine cycles are required, as a minimum, to perform a memory read operation. Clearly, the microprocessor does not wait for completion of the running operation in order to read out from the control store, the next microinstruction. Instead, there is an overlap between execution of one operation and fetching of the subsequent microinstruction from the control store.

Turning again to FIG. 2, it may be seen that microprocessor CPC1 is duplicated, that is, CPU1 is provided with a second microprocessor CPC2 identical to CPC1. The ports PMB of the two microprocessors are respectively connected to channels PM1B0:31 and PM2B0:31. The ISU ports are respectively connected to channels ISU1 and ISU2. Channel PM1B0:31 is connected to the inputs of a DATA OUT register 10, to the outputs of a DATA IN register 11 and to the outputs of a set of tristate drivers 12. Likewise, channel PM2B0:31 is connected to the inputs of a register ADDROUT 20, to the outputs of a DATA IN register 21 and to the outputs of a set of tristate drivers 22.

A local memory 13, having capacity 256×36 bits, constitutes a bank of external registers which may be used by microprocessor CPC1 as well as its "duplication" CPC2. To this purpose, the inputs of the two registers 11 and 21 are connected to a channel 23 (having 32 bits) for outputting data from memory 13. The registers 11 and 21 may transfer to buses PM1B and PM2B, information read out from local memory 13. Likewise, the outputs (DATA OUT 0:31) of register 10 are connected to a channel 24, which connect them as an input to local memory 13 and to a first set of inputs of a multiplexer 14.

The outputs of register 20 are connected to a second input set of multiplexer 14, as well as to the inputs of an address/command decoder 15, which generates a set of selection signals S1, S2, TOP 7 and SX . . . SN. The outputs of multiplexer 14 are connected to the 32 "data-/address" leads of the system bus BUS A, and the inputs of the two sets of tristate drivers 12 and 22 are connected to the 32 "data" leads of system bus BUS B. The four "parity bit" leads of BUS B (channel 16) are connected to a set of inputs of a multiplexer 25. A second set of inputs of multiplexer 25 receives the parity bits as an output from local memory 13. Multiplexer 25 selectively transfers to output channel CK, the signals received at one of the sets of inputs.

Channel PM2B0:31 is connected to 32 inputs of a parity bit generator/checker CK GEN 26. Other four inputs of CK GEN 16 are connected to channel CK. When generator 26 works as a parity generator, it provides as an output for each input byte, an output parity bit. When generator 26 works as a parity checker, the four internally generated parity bits are compared with the four parity bits received from channel CK, and four parity error signals (PMBCK 0:3) are produced as an output in the case where the compared bits are unequal. The operation of generator 26 is defined by a timed control signal received at a control input 19. The outputs of generator 26 are connected to four inputs of a register 27 and a register 28. The corresponding outputs of register 28 are connected, through a four lead channel 31, to the corresponding parity bit inputs of local memory 13. Further, the corresponding outputs of registers 28 and 27 are connected to a first set of inputs of two EX OR gates 29 and 30.

Before completing the description of register 27 and 28, it is useful to again consider microprocessors CPC1 and CPC2 and their transfer bus PM1B and PM2B. The two buses PM1B0:31 and PM2B0:31 are respectively connected to the first and the second set of inputs of a comparator 18. Comparator 18 provides as an output on a four lead channel PMC0÷3, a comparison code. The function of comparator 18 is to compare in continuous mode, byte by byte, the information present on buses PM1B and PM2B and to provide as an output for each compared byte pair, a signal at a logic level "0" if the compared bytes coincide, or a signal at a logic level "1" if they are different. Therefore, a logic level appears on one or more of the PMC0÷3 outputs, in case of an error. The outputs MPC 0:3 are connected, through channel 33, to corresponding inputs of registers 27 and 28. The corresponding outputs of registers 27 and 28 are connected to corresponding inputs of a second set of input EX OR gates 29 and 30. The outputs of EX OR gates 29 and 30 are respectively connected to first and second sets of inputs of a multiplexer 17, whose outputs are connected to the four "parity bit" leads of channel BUS A.

Control ports CTR of microprocessors CPC1 and CPC2 are respectively connected by channels CTR1 and CTR2 to corresponding inputs of a comparator 34, which provides as an output, on lead COCOM, an error signal at a logic level 1 if the control signals present on channels CTR1 and CTR2 differ from each other. Registers 10, 11 and 21 are "transparent latch" registers timed by signal X1 and enabled by a selection signal output from decoder 15. Likewise, the "tristate drivers" 12 and 22 are enabled by a selection signal output from decoder 15 and are timed by X1 signal which rises in the cycle following the one in which microprocessors CPC1 and CPC2 have received signal DIE=1.

Multiplexers 14 and 17 are timed by control and selection signals generated by the memory control unit MMU which further controls access to the system bus. Registers 27 and 28 are "transparent latch" registers timed by signal X0 and X1 respectively and with a suitable delay. Register 20 is timed by control signal (EREP, BAV) from the set of ports CTR synchronous with signal X0.

The described architecture of FIG. 2, in order to provide fault tolerance, follows two basic criteria. The elements which perform a data storage and channelling function are controlled by means of parity bits. The elements which perform functions other than the previous two (Boolean operations, arithmetic operations, conversion operations) are controlled by a "duplication" of the function and control (comparison) of the information at the input and output. Thus, data in inputs through BUS B and drivers 22 are controlled by parity generator 26 which regenerates parity bits and compares them with the original parity bits present on BUS B and received through multiplexer 25. A further check is performed by comparator 18 which compares the data present on channels PM1B and PM2B. This assures that the two sets of drivers 12 and 22 perform in the same way and do not introduce any error. If a discrepancy is detected between signals in the outputs from comparator 18 and parity generator 26, there must be some wrong with the functioning of multiplexer 25 or generator 26 or comparator 18.

The same criteria is followed for data stored in the local memory 13 together with their respective parity bits. This data is transferred on channel PM2B, via channel 23 and DATA IN register 21. The parity bits are regenerated by generator 26 and compared with parity bits read out from local memory and received through multiplexer 25. This checks the integrity of information output from local memory 13 and present on bus PB2B. A further control operation is performed by comparator 18 which tests the correct behavior of input registers 11 and 21.

As to the information output, the procedure which assures information integrity is substantially the same. Integrity at the source is assured by comparator 18 which tests for equality in contents of channels PM1B and PM2B. Addresses are transferred outside through register 20 and generator 22 provides the corresponding parity bits, which are loaded into register 27, together with output information from comparator 18. If the information as originated is error free (same information on both PM1B and PM2B) the EX OR gates 29 transfer the parity bits on BUS A through multiplexer 17, without modification. If the information as originated is defective (PM1B≠PM2B and therefore PLC0:3≠0), the EX OR gates 29 modify the parity bits and the information present on BUS 1 results are affected by the parity error and may be ignored by the receiving unit. Error propagation is therefore prevented, which is very important.

In act, bear in mind that an error indication output from comparator 18 (as well as from other comparators) is loaded into an error register at the end of a machine cycle, indicative when signal X1 drops to 0. This is required to avoid the recognition of spurious and transient signalling. It is only at the time that the computer takes into proper account the error occurrence and, if required, halts the operation and signals an error. Absent an error signal, prior to such moment, the operations already started in the course of the machine cycle, such as a memory write at an incorrect memory address, may have severe and unrecoverable consequences (i.e., the loss of information already contained in the incorrectly addressed memory location).

The same integrity criterion is followed for the output data. Output data is transferred from PM1B through register 10 and from there can be sent to local memory 13, through bus 24 or to BUS A through multiplexer 14. Comparator 18 assures the data integrity at the source by the comparison of the contents of PM1B and PM2B. Generator 26 provides the parity bits which, through register 28, EX OR gates 30 and multiplexer 17, are loaded on BUS A unchanged or modified depending on the comparison result at comparator 18. In local memory 13, the parity bits in any case are loaded in unchanged form because there is no need to invalidate the incorrect data. Therefore, the comparator 18, generator 26 and the EX OR gates 29 and 30 provide for effective and immediate protection against error propagation outside the CPU.

Another aspect which is worth specific mention is that, contrary to the redundancy systems of the prior art in which a processor, such as CPC1 operates as a functional unit, and its replica CPC2 operates as merely a duplicate for test purposes, and the information transfer outside the CPU is performed by a single processor, such as CPC1, in the architecture shown in FIG. 2, both processor CPC1 and CPC2 share the various tasks. In particular, CPC1 transfers output data through register 10, while CPC2 transfers output addresses through register 20. Therefore, by partitioning the output load on both processors, the output load of each of the two processors is reduced and their performance enhanced.

FIG. 3 shows further elements of central processing unit CPU1. Channels ISU1 and ISU2 which connect to the ISU ports of processors CPC1 and CPC2 are connected to the inputs of register 40 (CSAREG 1) and 41 (CSAREG 2) respectively. These registers are used for storing a control memory address. They are periodically loaded at the falling edge of signal X0, which is received at a clock input. The outputs of register 41 are always enabled. The outputs of register 40 are enabled by a signal ENFIRM when at a logic level 0 applied to a control input. The outputs of register 41 are connected to a first set of inputs of a comparator 42 and to the address inputs of a read only memory (ROM) 43 having capacity of 4K words, each 16 bits in length. The outputs of register 40 are connected to the second set of inputs of comparator 42 and to the address inputs ADD of a read/write memory RAM 44 having capacity of 64K words, each 18 bits in length.

Comparator 42 compares the 16-bit output addresses from registers 40 and 41 respectively byte by byte, and provides as an output, two signals $CONCS_{\frac{1}{2}}$ having a logic level 0 in the case where the addresses coincide. In case of inequality, one or both output signals rise to a logic level 1.

The 16 data outputs of ROM 43 are connected to a first set of inputs A of two multiplexers 45 and 46. Sixteen of the 18 data outputs of RAM 44 are connected to a second set of inputs B of the two multiplexers 45 and 46. The outputs of multiplexer 45 and 46 are connected, respectively, through channels 47 and 48 to channels ISU1 and ISU2. Multiplexers 45 and 46 are controlled respectively by selection signals ABIL 0 and ABIL 1. When ABIL 0=0, input set A of multiplexer 45 is selected. When ABIL 0=1, input set B is selected. Likewise, when ABIL 1=0, input set A of multiplexer 46 is selected, and when ABIL 1=1, input set B is selected. The outputs of both multiplexers 45 and 46 are controlled by signal X1. When X1=1, the outputs are enabled to transfer information on channels 47 and 48, respectively, otherwise, they are held in a high impedance state.

The operation of control stores RAM 44 and ROM 43 is as follows. In initialization mode, when the system is put into service, the two microprocessors CPC1 and CPC2 (FIG. 2) force onto channels ISU1 and ISU2, a preestablished control store address, for instance "all zeros" for starting the initialization process. This occurs during phase X0=1. By forcing X0 to a 0, the address is loaded into the two registers 40 and 41, compared by comparator 42 and written into RAM 44 and ROM 43. Reading RAM 44 does not produce any useful result at the output, because RAM 44 is empty. Reading ROM 43 produces as an output, a microinstruction code which is present at the A input of both multiplexers 45 and 46. In the initialization mode, the two signals ABIL0 and ABIL1 are both at a logic level 0. Therefore, during the phase X1=1 which immediately follows, the microinstruction is transferred on channels ISU1 and ISU2 and received by both microprocessors CPC1 and CPC2 which controls their operation during the following cycle.

In the initialization mode, a microprogram residing in ROM 43 causes the loading of RAM 44 using the procedure which will be considered herein. Once RAM 44 is loaded, it is possible to change from the initialization mode to a normal operation mode. In the operation mode, all operations are controlled by microprograms which reside in RAM 44. In order to switch from initialization mode to normal mode, it is suffices to change the control signals of the two multiplexers from level 0 to level 1 (i.e., ABIL0=1, ABIL1=1). Under these conditions, the addresses present in registers 40 and 41 are again compared by comparator 42 (i.e., refer again to the two control stores 44, 43). The output information from ROM 43 which is generally meaningless, is ignored and it is the information read out from RAM 44 which is transferred on channels ISU1 and ISU2.

In order to load RAM 44, a 16-bit register 49 is provided. Inputs of register 49 are connected to 16 of the 32 leads of internal data channel 35. The remaining 16 leads of channel 35 are connected to 16 data inputs of RAM 44 through channel 50. Two remaining data inputs of RAM 44 which have an 18-bit parallelism are connected to two leads of channel 31 of FIG. 2 and receive parity bits PMBCK 2:3 related to the information present on channel 50. RAM 44 is controlled for a write operation by a signal when at a logic level 0 is present at a control input WE. Such signal is obtained as output from a NAND gate 51 which receives as inputs, timing signal X0 and previously mentioned ENFIRM signal. The loading of register 49 is controlled by a signal obtained as output from AND gate 52 which receives as inputs, signal X1 and signal ENFIRM.

Register 49 outputs are connected to the address inputs ADD of RAM 44 and therefore to the output of register 40 (CSAREG1). It is clear that, in order to avoid unacceptable interference, the outputs of registers 49 and 40 must be enabled in a mutually exclusive way. In fact, the outputs of register 49 are enabled by a control signal ENLDRM when at a logic level 0. Such signal is logically, the inverted form of signal ENFIRM. In order to produce signals ENFIRM and ENLDRM, a register 52 is provided which is periodically loaded upon the occurrence of the raising edge of signal X1. Cells 53 and 54 of register 52 receive as inputs, output signals CONSC1 and CONSC2 from comparator 42. Cell 55 receives an input, a signal TOP 7 which is an output from decoder 15 of FIG. 2. Cell 56 receives as an input, the output signal from cell 55 previously inverted by NOT 58. Cell 57 receives as input, the output signal from cell 55. Output signals from cells 56 and 57 are respectively signal ENLDRM and signal ENFIRM.

For the reasons that will appear more clearly from the following, signals ENFIRM and ENLDRM in addition to registers 40 and 49 and RAM 44, also control the flow of signals CONSC1 and CONSC2. To this purpose, a four-input section AND OR GATE 59 has the inputs of each section connected to receive the signal pairs CONCS1D-ENFIRM, CONCS2D-ENFIRM, CONCS1-ENLDRM and CONCS2-ENLDRM. CONCS1D and CONCS2D are the output signals from cells 53 and 54, respectively. Gate 59 provides as an output, control store error signal ERCOCS which has a logic level 1 on the occurrence of an error.

Figure 5:
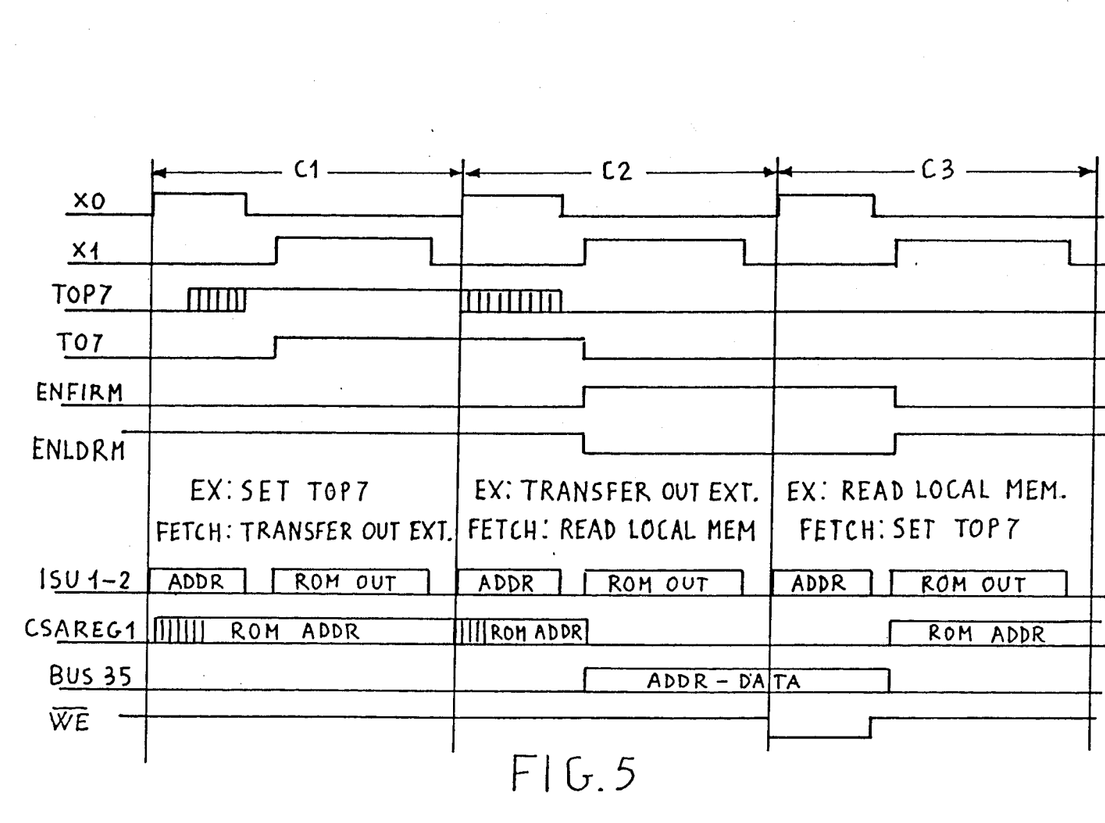
FIG. 5 is a timing diagram showing the operation of some components of the processor of FIGS. 2 and 3.

For a better understanding of the way in which RAM 44 is loaded and the way in which control store error signals are in turn controlled, it is useful to refer to the timing diagram of FIG. 5. Diagrams X0 and X1 show the timing signals which define subsequent machine cycles C1, C2 and C3. It is assumed that prior to these cycles, the computer, by using ROM 43 resident microprograms, has loaded the local memory 13 with information pairs (address—microinstruction) used in loading RAM 44. The source of such information may be a working memory of the system, loaded in turn by a disk memory. However, during initialization, it is preferable, for diagnostic purposes, not to resort to external units and it is possible to use as data, a set of the information contained in a field of ROM memory 43. This set is read out and loaded into the local memory 13, to be recalled 32 bits of information at a time from an internal microprocessor register.

FIG. 5 shows the case in which the microprocessors CPC1 and CPC2 have already loaded into an internal register, the information to be written into RAM 44 and the related address. During cycle C1, the microprocessors execute a microinstruction for the loading of register 52 (EX:SET TOP 7) and at the same time, the next microinstruction is fetched (FETCH:TRANSFER OUT EXIT). Diagram TOP 7 shows that within phase X0=1, the selection signal TOP 7, generated by decoder 15, rises to a logical level 1. On the rising edge of signal X1, cell 55 of register 52 is set and signal T07 is produced as an output (diagram T07). It is clear that since signal T07 was previously at a logic level 0, output signals ENFIRM and ENLDRM from cells 57 and 56, respectively, were and remain at logic levels 0 and 1, respectively (Diagrams ENFIRM, ENLDRM). The states of cells 53 and 54 depend on the error conditions.

During cycle C1, the next microinstruction is fetched. Therefore, in phase X0=1, channels ISU1 and ISU2 contain a control memory address (Diagram ISU1−2). Diagram CSAREG1 shows the output information from register 40. When ENFIRM=0, such information for the whole duration of cycle C1, is the ROM address (ROM ADDR) loaded into register 40. A possible address discrepancy detected by comparator 42 before X1 rises to a 1, causes the setting of either one or both cells 53 and 54. Signals CONCS2D and CONS1D appearing at the outputs of such cells does not generate an output error signal from gate 59, because signal ENFIRM=0 masks the possible presence of such signals. However, a possible address discrepancy is detected by gate 59 because signals CONCS1 and CONSC2 are enabled by ENLDRM=0 to generate signal ERCOCS.

When phase X1=1, the microinstruction read out from ROM 43 (ROMOUT, diagram ISU1−2) is transferred on channels ISU1 and ISU2 and establishes the operation to be performed during cycle C2. During cycle C2, the next following microinstruction is fetched by placing an address on channels ISU1 and ISU2 during phase X0=1, and the microinstruction is read out during phase X1=1. The address is latched in register 40 for the whole duration of cycle C2. However, since the new microinstruction which is executed does not control the loading of register 52, signal TOP 7 drops to a 0 and on the rising edge of X1, cell 55 is reset and signal T07 drops to a 0. At the same time, cell 56 is set and cell 57 is reset so that signals ENFIRM and ENLDRM toggle to 1 and 0, respectively. The outputs of register 40 are disabled and the information present at node 60 ceases to be meaningful as a ROM address.

The possible address error indication following a discrepancy, previously detected between the output information from register 40 and the output information from register 41, however, is not lost. In fact, when X1=1, it is stored in cells 53 and 54 whose signals CONCSD1 and CONCSD2 are now enabled by ENFIRM=1. Therefore, the possible resulting error signal ERCOCS may be loaded into an error latching register at the end of phase X1=1. By contrast, it must be noted hat from the beginning of phase X1=1, due to ENLDRM=0, the possible output error signals (CONCS1, CONCS2) from comparator 42 become ineffective to produce an error signal consistent with the fact that the discrepancy between input signals becomes meaningless as to a possible error.

Beginning with phase X1=1, microprocessor CPC1 places on bus PM1B, 32 bits of information, 16 bits of which define a RAM 44 address where to write the remaining 16 bits. The information is transferred through DATA OUT register 10 on channel 24. From channel 24, via channel 35, it is inputted partially to register 49 and partially to the data inputs IN of memory 44 (i.e., in FIG. 5, diagram BUS 35, signal ADDR-DATA). The "address" portion is loaded into register 49 by a load signal which is the logical NAND performed by NAND gate 152 of signals X1 and EN-FIRM. It is transferred to node 60 due to enabling signal ENLDRM=0, which enables the register outputs from the rising to a 1 of signal X1 to the next rising to 1 of X1 within cycle C3. The "data" portion is present on channel 50 during the same interval.

As previously mentioned, the error signals at the output of comparator 42, during such time interval are masked. At the beginning of cycle C3, the fetching of the next following microinstruction from ROM 43 begins. This microinstruction may control, by way of example, a new setting of cell 55 (SET TOP 7). Meanwhile, the preceding microinstruction is executed, which may consist of a local memory 13 read (EX: READ LOCAL MEM) to load an internal microprocessor register with new information to be written into RAM 44, together with its related address. Independently of such operation, when ENFIRM=1 and X0=1, a signal at a logic level 0 is applied to the WE input of RAM memory 44, which is therefore controlled in writing (in FIG. 5 diagram WE).

In the course of cycle C3, there is still the possibility of testing the correctness of the addresses present on channels ISU1 and ISU2. In fact, during phase X0, the discrepancy between input information to comparator 42 is duly masked at the input of gate 59 (ENLDRM=0) because it is meaningless in terms of error/failure. In addition, the error indication which is stored in cells 53 and 54 at the beginning of phase X1=1 is also masked. At the same instant, ENFIRM signal drops to a 0 due to the resetting of cell 57. On the contrary, at the beginning of phase X11, the address previously loaded in CSAREG−1 register 40 is made available at node 60 and may be compared with address loaded into register 41. The possible error signals CONCS1 and CONCS2 at the output of comparator 42 are enable to generate error signal ERCOCS=1, at the output of gate 59 because signal ENLDRM rises to 1 again. In this way, the loading of RAM memory 44 is performed without exception to the continuous monitoring by the comparison of the running operations.

It is clear that during the RAM memory 44 loading, which occurs in the initialization phase, signals ABIL0 and ABIL1, which control multiplexers 45 and 46 are both at a logic level 0. In order to assure the correctness of the data which will be read out from RAM memory 44, it is provided with cells for storing parity bits which are loaded through channel 31. The memory check outputs CKM, corresponding to such cells, are connected to the inputs of a parity control network 61, which receives on other inputs, the data output from RAM 44. In case of a parity error, the network 61 outputs a parity error signal ERCKCS having a logic level 1. Clearly, the network is enabled only in the normal operating mode, by signal ABIL0=1, when the microinstructions are effectively read out from RAM 44.

The above description clearly shows the essential role which is played by comparators 18, 34 and 42 in the identification of the correctness of the computer operation. However, in order to be certain that in case of a discrepancy between the behavior of microprocessor CPC1 and CPC2, this is effectively detected and signalled, it is necessary to test that detection and signalling occurs effectively. To this purpose, the computer may operate in diagnostic mode and circuit elements which make possible this operating mode are provided herein. Thus, in addition to multiplexers 45 and 46 which may be controlled independently from each other by signals ABIL0 and ABIL01, the computer further comprises a state register 62 which may be selected as ar external register by a selection signal SX from decoder 15 and loaded with the contents of channel 24 at the falling edge of signal X1. Register 62 has a clock input connected to the output of NAND gate 63 which receives as inputs, signals SX and X1. The data inputs of register 62 are connected to channel 24. Register 62 is reset at the powering on of the system.

One register cell, referenced as INIZ/NORM provides as an output, signal ABIL1. A second register cell, referenced as DIAG 1 provides as an output, a signal which defines a first operative mode for diagnostic purposes. The outputs of cells INIZ/NORM and DIAG 1 are respectively connected to the input of OR gate 64 which provides as an output, signal ABIL0. It is clear that when the computer is powered on, the register 62 is reset. Also, both signals ABIL0 and ABIL1 are at logic 0 levels and the computer is set in the initialization mode. In other words, the computer operates under control of the ROM 43 resident microprogram. Due to such microprograms, the computer loads suitable microprograms into RAM 44.

In particular, it is possible to load into certain RAM 44 locations, the same microinstructions which are stored in ROM 43 at corresponding locations having the same address or different microinstructions. At this point, register 62 may be loaded so as to set cell DIAG−1, with the effect of switching signal ABIL0, to a 1. From this time on, it is clear that the two computer sections, the one comprised of microprocessor CPC1, the other comprised of microprocessor CPC2 operate under control of microinstructions received from difference sources, RAM 44 and ROM 43, respectively. Therefore, they are placed in a condition to perform different operations and to produce different input/output information on channels PM1B and PM2B with the consequent and necessary activation of comparators 18 and 34 This is true even in case where the address present on channels ISU1 and ISU2 is the same during subsequent cycles.

Furthermore, it is clear that the control memory addresses generated by the two microprocessors CPC1 and CPC2 may be conditioned by the execution of the running microinstruction. Thus, if the microinstruction performed by CPC1 controls an unconditional jump, and the microinstruction simultaneously performed by CPC2 does not control an unconditional jump, the two microprocessors, even if departing from the same microprogram address may reference at the same time, microinstructions which reside at different addresses. The contents of ISU1 and ISU2 during phase X0 therefore becomes different with the consequent and necessary error indication by comparator 42, whose functionality may therefore be tested. Likewise, if the microinstructions performed by CPC1 and CPC2 are both conditional branches, but the condition which causes the branch is true for one microprocessor only, it is clear that the address updating on channels ISU1 and ISU2 occurs in a different way. Therefore, the described architecture permits an efficient verification of the comparators functionality without requiring the addition/insertion of error injecting circuits (EX OR) in the information flow paths, with the resulting disadvantages in terms of complexity, cost, performance degradation.

The handling of the error signals which are generated during normal operation mode or diagnostic mode is beyond the scope of the invention. However, it is obvious that the described architecture comprises, as it is provided in conventional architectures, error handling logic, shown as logic block 65 in FIG. 3 (ERROR MANAG. LOGIC). Here, the several error signals such as ERCOCS, ERCKCS, PMC0÷3 COCOM and PMBCK0÷3, generated at different points of the computer architecture, are stored in an input register 66, at the end of each machine cycle (for instance at the falling edge of signal X1). Depending on the case and the operative modality, they may provide, in addition to a displayed error indication 67 on an operator panel, a computer HALT command, or a command TRAP for storing the error indication: and the contents of certain working registers in suitable memory locations.

In general, it is clear that in test mode, error conditions are intentionally generated and the test programs will be organized so that the error conditions, intentionally produced, do not cause a block of the test process but permit its execution. Moreover, it may be arranged that in certain conditions, it is the absence of an error indication which indicates the presence of a fault or malfunctioning and causes the halting of the process. The architecture described with reference to the drawings is a preferred form of embodiment and it is clear that changes can be made, without departing from the scope of the invention. In particular, it is worth noting that the logic of FIG. 3 and the use of a state register 62 to define the diagnostic mode by which CPC1 and CPC2 are controlled by two different microprograms is a preferred arrangement.

This arrangement is able to exploit the full capacity of RAM 44 as control memory, in normal mode, and in addition, the ROM 43 capacity in the initialization mode. In other words, the available control memory size is 68K words, 4K of which is permanently stored and can be used in initialization and diagnostic mode and 64K of which can be used in normal mode. An alternative embodiment which gives up this advantage may be base on the fact that even if ROM 43 has a capacity of 4K words, register CSAREG 2 is a 16-bit register used for latching the 16-bit information present on channel ISU. The output address bits from register CSAREG 2 may therefore be used to control very simple logic which generate signals ABIL 0 and ABIL 1.

The concept followed is that for addresses between and 4K, ROM 43 is selected, for addresses between 4K and 60K, RAM 44 is selected and for addresses between 60K and 64K, both RAM 44 and ROM 43 are selected. This is possible because each of the addresses between 60K and 64K coincide with the corresponding addresses between 0 and 4K with exception of the four most significant bits, ADDR 13÷16, which are obviously neglected when addressing ROM 43. A very simple logic circuit, which is not necessary to show, may perform the Boolean function expressed by the following two equations:

$$ABIL0 = ADDR13 + ADDR14 + ADDR15 + ADDR16; \text{and}$$

$$ABIL1 = \overline{ABIL0} \cdot \overline{ADDR13} \cdot \overline{ADDR14} \cdot \overline{ADDR15} \cdot \overline{ADDR16}.$$

This arrangement provides for the automatic passage from one operating mode to another operating mode as a function of the addresses but has the disadvantage that the RAM memory locations having addresses between 60K and 64K, may only be used in diagnostic mode and not in normal mode.

What is claimed is:

1. A fault tolerant computer architecture comprising:
   a functional processing unit having an input and output, a programmable control store and a plurality of channels connected to said input and output of said processing unit and to said store for inputting/outputting information, inputting control instructions stored in said control store, and for outputting addresses for addressing said control store;
   a duplicate unit of said functional processing unit;
   a plurality of comparators connected to different ones of said plurality of channels for comparing input and output information from said functional unit with the corresponding input and output information from said duplicate unit;
   said control store comprising:
      a first memory addressable by said functional unit and a second memory addressable by said duplicate unit;
      first logic means for receiving a number of selection signals and in response to said selection signals controlling the transfer of control instructions from said first memory, selectively to said functional unit or jointly to said functional unit and said duplicate unit and for controlling the transfer of control instructions from said second memory in a mutually exclusive manner relative to said control instructions from said first memory, selectively applied to said duplicate unit or jointly to said functional unit and said duplicate unit; and,
      second logic means for generating said number of selection signals, said selection signals defining an initialization operative mode in which said control instructions from said second memory are jointly transferred to said functional unit and said duplicate unit, a normal operative mode in which said control instructions from said first memory are transferred jointly to said first functional unit and said duplicate unit, and a diagnostic operative mode in which said control instructions from said first memory are transferred to said functional unit and said control instructions from said second memory are transferred to said duplicate unit.

2. The computer architecture of claim 1 wherein said first logic means comprises a pair of multiplexers having two input paths and one output path, said two input paths of each of said multiplexers respectively being connected to the outputs of said first and second memories, said one output path of each of said multiplexers being respectively connected to the control instruction input channel of said functional unit and said duplicate unit respectively.

3. The computer architecture of claim 1 wherein said functional unit and said duplicate unit apply to said outputs connected to one of said channels at subsequent time intervals of a same machine cycle, address information and data information for addressing storage elements external to said units and for storing said data information in said storage elements, said computer architecture further comprising:
   a first register having inputs connected to said one channel of one of said units for storing said address information during a machine cycle; and, a second register having inputs connected to said one channel of the other one of said units for storing said data information during a time period having the duration equal to the duration of said machine cycle.

4. The computer architecture of claim 1 comprising:
a parity generator for generating parity bits related to the information outputted on one of said channels of one of said units;

third logic means responsive to a discrepancy in signals produced by at least one of said comparators when the information from said functional unit differs from the information from said duplicate unit, to change at least one of said parity bits; and, circuit means for transferring outside said computer architecture, information outputted on one of said channels of one, of said units together with said related parity bits as modified by said third logic means.

* * * * *